United States Patent
Huang

(10) Patent No.: US 12,335,332 B2
(45) Date of Patent: Jun. 17, 2025

(54) DEVICE PROTECTION METHOD, AND DEVICES

(71) Applicant: New H3C Technologies Co., Ltd., Zhejiang (CN)

(72) Inventor: Fengxian Huang, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 368 days.

(21) Appl. No.: 17/997,517

(22) PCT Filed: Apr. 30, 2020

(86) PCT No.: PCT/CN2020/088413
§ 371 (c)(1),
(2) Date: Oct. 28, 2022

(87) PCT Pub. No.: WO2021/217616
PCT Pub. Date: Nov. 4, 2021

(65) Prior Publication Data
US 2023/0177153 A1    Jun. 8, 2023

(51) Int. Cl.
*H04L 67/10*    (2022.01)
*G06F 21/55*    (2013.01)

(52) U.S. Cl.
CPC ............ *H04L 67/10* (2013.01); *G06F 21/554* (2013.01); *G06F 2221/034* (2013.01)

(58) Field of Classification Search
None
See application file for complete search history.

(56) References Cited

U.S. PATENT DOCUMENTS

| 9,516,053 B1 * | 12/2016 | Muddu | ............... G06F 16/9024 |
| 2017/0006141 A1 * | 1/2017 | Bhadra | ................... H04W 4/70 |

(Continued)

FOREIGN PATENT DOCUMENTS

| CN | 105376246 A | 3/2016 |
| CN | 107220542 A | 9/2017 |

(Continued)

OTHER PUBLICATIONS

ISA China National Intellectual Property Administration, International Search Report Issued in Application No. PCT/CN2020/088413, Jan. 13, 2021, WIPO, 4 pages.
Japanese Patent Office, Decision of Refusal Issued in Application No. 2022-549302, Dec. 19, 2023, 4 pages. (Submitted with Machine Translation).

(Continued)

*Primary Examiner* — Kaveh Abrishamkar
(74) *Attorney, Agent, or Firm* — McCoy Russell LLP

(57) ABSTRACT

The present disclosure provides a method of protecting a device and a device. The method includes: obtaining a plurality of pieces of first security event information generated during operation of the edge security device; performing statistical analysis on the plurality of pieces of first security event information, so as to obtain first statistical analysis information; transmitting the first statistical analysis information to a central security device, so that the central security device generates a first target protection template based on the first statistical analysis information; wherein the first target protection template includes a security protection strategy generated based on the first statistical analysis information; receiving the first target protection template transmitted by the central security device; and protecting the edge security device based on the security protection strategy in the first target protection template.

17 Claims, 7 Drawing Sheets

(56) References Cited

U.S. PATENT DOCUMENTS

| | | | |
|---|---|---|---|
| 2018/0375826 A1 | 12/2018 | Chang et al. | |
| 2019/0392328 A1 | 12/2019 | Gil Bulacio et al. | |
| 2020/0059483 A1* | 2/2020 | Weingarten | G06F 21/552 |
| 2020/0084241 A1* | 3/2020 | Sinha | H04W 4/50 |
| 2022/0366081 A1* | 11/2022 | Booth, Jr. | G06F 16/783 |
| 2023/0177153 A1* | 6/2023 | Huang | H04L 63/145 |
| | | | 726/23 |

FOREIGN PATENT DOCUMENTS

| | | | |
|---|---|---|---|
| CN | 207369068 U | 5/2018 | |
| CN | 108965477 A | 12/2018 | |
| CN | 109302380 A | 2/2019 | |
| CN | 109617865 A | 4/2019 | |
| CN | 109639840 A | 4/2019 | |
| CN | 109714431 A | 5/2019 | |
| CN | 109889575 A | 6/2019 | |
| CN | 110209716 A | 9/2019 | |
| CN | 110401262 A | 11/2019 | |
| CN | 110633247 A | 12/2019 | |
| GB | 2581989 A | 9/2020 | |
| JP | 2017111796 A | 6/2017 | |
| JP | 2019502212 A | 1/2019 | |
| JP | 2020046781 A | 3/2020 | |

OTHER PUBLICATIONS

Zhang, J. et al., "Survey on data security and privacy-preserving for the research of edge computing," Journal on Communications, vol. 39, No. 3, Mar. 25, 2018, 21 pages.

ISA State Intellectual Property Office of the People's Republic of China, Written Opinion of the International Searching Authority Issued in Application No. PCT/CN2020/088413, Jan. 13, 2021, WIPO, 7 pages.

State Intellectual Property Office of the People's Republic of China, Office Action and Search Report Issued in Application No. 202080000659.0, Feb. 24, 2023, 21 pages. (Submitted with Machine Translation).

European Patent Office, Extended European Search Report Issued in Application No. 20933629.6, Mar. 2, 2023, Germany, 10 pages.

Japanese Patent Office Action, Office Action Issued in Application No. 2022-549302, Aug. 22, 2023, 12 pages. (Submitted with Machine Translation).

State Intellectual Property Office of the People's Republic of China, Office Action and Search Report Issued in Application No. 202080000659.0, Sep. 27, 2023, 19 pages. (Submitted with Machine Translation).

European Patent Office, Office Action Issued in Application No. 20933629.6, Oct. 30, 2023, Netherlands, 4 pages.

* cited by examiner

DEVICE PROTECTION METHOD, AND DEVICES

CROSS REFERENCE TO RELATED APPLICATION

The present application is a U.S. National Phase of International Application No. PCT/CN2020/088413 entitled "DEVICE PROTECTION METHOD, AND DEVICES," and filed on Apr. 30, 2020. The entire contents of the above-listed application are hereby incorporated by reference for all purposes.

TECHNICAL FIELD

The present disclosure relates to the field of communication technologies, and more particularly, to a method of protecting a device, and a device.

BACKGROUND

The Internet of Things (IoT) is an Internet of Everything. The IoT is an extended and expanded network based on the Internet. By combining various IoT devices with the Internet, a huge network can be formed to realize interconnection of people, devices and things at any time and at any place.

With popularization of the IoT, an increasing number of IoT devices (that is, various types of IoT terminals, such as cameras, smart phones, smart TVs, or the like) are connected to the IoT, and attacks on IoT devices are becoming more common. An attacker may obtain user's privacy data from an IoT device, that is, data stored by the IoT device (for example, for a camera used by the user for his own use, data collected and stored in the camera is the user's privacy data) facing risks such as illegal collection, illegal leakage, unauthorized usage or the like.

In order to protect privacy data of the IoT devices, in the related art, a central security device performs a security analysis on the environment where the IoT devices are located, and protects the IoT devices based on the analysis results. However, due to the large amount of computing resources consumed by security analysis, with the large increase in IoT devices, the computing resources of the central security devices have been unable to meet the protection needs of a large number of IoT devices.

SUMMARY

The present disclosure provides a method of protecting a device and a device, which can protect edge security devices or IoT devices, save computing resources of central security devices, and meet the protection needs of a large number of devices.

In a first aspect, the present disclosure provides a method of protecting a device, which is applied to an edge security device and includes: obtaining a plurality of pieces of first security event information generated during operation of the edge security device; performing statistical analysis on the plurality of pieces of first security event information to obtain first statistical analysis information; transmitting the first statistical analysis information to a central security device, so that the central security device generates a first target protection template based on the first statistical analysis information; wherein the first target protection template includes a security protection strategy generated based on the first statistical analysis information; receiving the first target protection template transmitted by the central security device; and protecting the edge security device based on the security protection strategy in the first target protection template.

In a second aspect, the present disclosure provides a method of protecting a device, which is applied to an IoT device and includes: obtaining a plurality of pieces of second security event information generated during operation of the IoT device; performing statistical analysis on the plurality of pieces of second security event information to obtain third statistical analysis information; transmitting the third statistical analysis information to an edge security device, so that the edge security device transmits the third statistical analysis information to a central security device, and the central security device generates a second target protection template based on the third statistical analysis information; wherein the second target protection template includes a security protection strategy generated based on the third statistical analysis information; receiving the second target protection template transmitted by the edge security device; and protecting the IoT devices based on the security protection strategy in the second target protection template.

In a third aspect, the present disclosure provides an edge security device, including a processor and a machine-readable storage medium, the machine-readable storage medium storing machine-executable instructions executable by the processor; wherein the processor is for executing the machine-executable instructions to implement steps of: obtaining a plurality of pieces of first security event information generated during operation of the edge security device; performing statistical analysis on the plurality of pieces of first security event information to obtain first statistical analysis information; transmitting the first statistical analysis information to a central security device, so that the central security device generates a first target protection template based on the first statistical analysis information; wherein the first target protection template includes a security protection strategy generated based on the first statistical analysis information; receiving the first target protection template transmitted by the central security device; and protecting the edge security device based on the security protection strategy in the first target protection template.

In a fourth aspect, the present disclosure provides an IoT device, including a processor and a machine-readable storage medium, the machine-readable storage medium storing machine-executable instructions executable by the processor; wherein the processor is for executing the machine-executable instructions to implement steps of: obtaining a plurality of pieces of second security event information generated during operation of the IoT device; performing statistical analysis on the plurality of pieces of second security event information to obtain third statistical analysis information; transmitting the third statistical analysis information to an edge security device, so that the edge security device transmits the third statistical analysis information to a central security device, and the central security device generates a second target protection template based on the third statistical analysis information; wherein the second target protection template includes a security protection strategy generated based on the third statistical analysis information; receiving the second target protection template transmitted by the edge security device; and protecting the IoT devices based on the security protection strategy in the second target protection template.

As can be seen from the above technical solutions, in the present disclosure, the edge security device is protected based on the first target protection template, thereby protecting the data security of the edge security device, and preventing an attacker from obtaining user's privacy data from the edge security device. The IoT device is protected based on the second target protection template, thereby protecting the data security of the IoT device, and preventing an attacker from obtaining user's privacy data from the IoT device. Statistical analysis is performed on the security event information by the edge security device and the IoT device, so as to use the computing resources of the edge security device and the IoT device, instead of the computing resources of the central security device for statistical analysis, thus saving the computing resources of the central security device.

DETAILED DESCRIPTION

Figure 1:
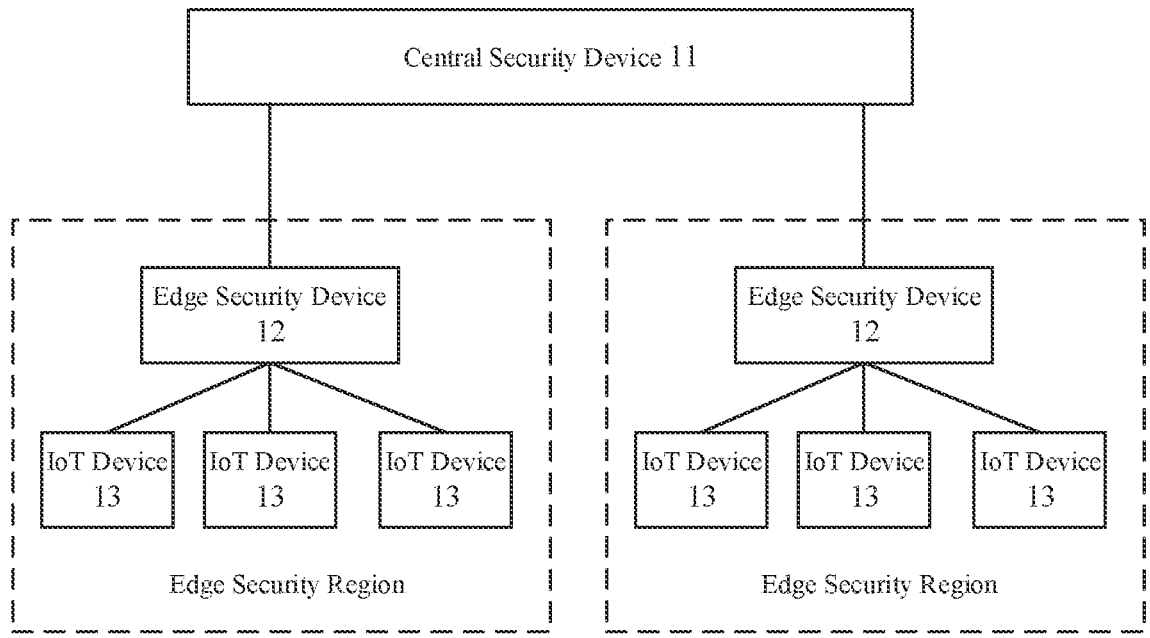
FIG. 1 is a schematic diagram illustrating a system structure in an example of the present disclosure.

As shown in FIG. 1, FIG. 1 is a schematic diagram illustrating a system structure of an IoT. The system structure includes a central security device 11, edge security devices 12, and IoT devices 13. The number of edge security devices 12 can be more than one, and FIG. 1 illustrates two edge security devices 12. Each of the edge security devices 12 can be connected to a plurality of IoT devices 13, and FIG. 1 illustrates three IoT devices 13 connected to one edge security device 12.

The central security device 11 can also be referred to as a cloud security center, which is a security management system that recognizes, analyses, and warns of security threats in real time. Through security capabilities such as anti-ransomware, anti-virus, anti-tampering, and compliance inspections, the central security device 11 can protect the edge security devices 12 and the IoT devices 13, for example, for protecting data security.

In order to protect the edge security devices 12 or the IoT devices 13, the central security device 11 performs a security analysis on the operating environment of the edge security devices 12 or the IoT devices 13, and protects the edge security devices 12 or the IoT devices 13 based on the analysis results. However, in the above implementation, the central security device 11 performs security analysis that requires a large amount of computing resources.

In view of the above, in an example of the present disclosure, an edge security device 12 and a plurality of IoT devices 13 can form an edge security region, and the edge security device 12 and the IoT devices 13 in the edge security region perform security analysis. That is, the security analysis operation is performed based on computing resources of the edge security device 12 and the IoT devices 13, so that the computing resources of the central security device 11 can be saved.

Apparently, the above method deploys a function of the cloud security center to each edge security region. Since these edge security regions are distributed over the edge of the network as needed, the method can make full use of computing resources of the edge security regions and move the analysis operations from the cloud security center to the edge security regions, thereby sharing computing resources of the edge security regions.

An edge security region can also be referred to as an ES (Edge Security) region, that is, an ES-region. An edge security region can include an edge security device 12 and a plurality of IoT devices 13. The edge security device 12 can also be referred to as an edge security center (ES-core, i.e., ES center), which is a gateway, an access node, or an edge server located at the edge of the network. The IoT device 13 can also be referred to as an edge security node (ES-node, or ES node), which is a device that needs to be protected, such as various types of sensors, cameras, smart phones, smart TVs, smart air conditioners, smart refrigerators, IoT cars, or the like.

The technical solutions of the examples of the present disclosure will be described below in conjunction with specific examples.

Figure 2:
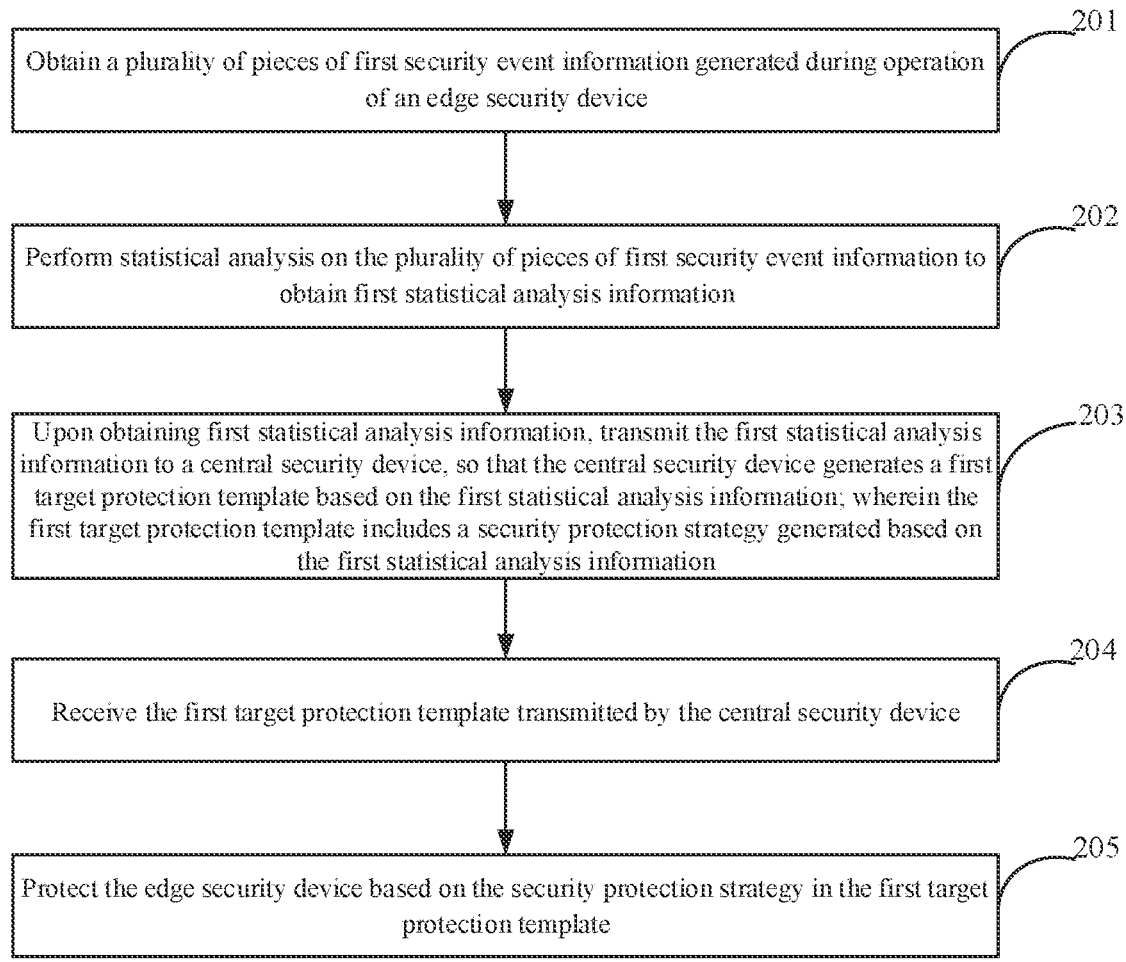
FIG. 2 is a flowchart illustrating a method of protecting a device in an example of the present disclosure.

Example 1. An example of the present disclosure provides a method of protecting a device. Referring to FIG. 2, FIG. 2 is a schematic flowchart illustrating a method of protecting a device. The method is applied to an edge security device. The method can include the following blocks.

At block 201, a plurality of pieces of first security event information generated during operation of an edge security device are obtained.

At block 202, statistical analysis is performed on the plurality of pieces of first security event information to obtain first statistical analysis information.

As an example, during the operation of the edge security device 12, all or part of the security events occurring on the edge security device 12 can be monitored, and information on these security events can be collected. For convenience of distinguishing, information on these security events is referred to as first security event information. For example, if a port vulnerability attack event occurs on the edge security device 12, information related to the port vulnerability attack event can be collected; if a virus attack event occurs on the edge security device 12, information related to the virus attack event can be collected.

Upon obtaining the plurality of pieces of first security event information, the edge security device 12 performs statistical analysis on the plurality of pieces of first security event information, and the statistical analysis process is not limited herein. For example, the number of security events can be counted, such as 10 times of port vulnerability attacks, 20 times of virus attacks, and 10 times of type A virus attacks, and so on. In another example, the number of serious-level security events can be counted, and the number of ordinary-level security events can be counted. For another example, the security level of the edge security device 12 can be analysed. For example, when the edge security device 12 is subjected to a large number of attacks, the security level can be determined to be low. Of course, the above are just a few examples, which are not limited herein, and all statistical and analysis operations based on the first security event information are within the scope of the present disclosure.

At block 203, after the first statistical analysis information is obtained, the first statistical analysis information is transmitted to the central security device, so that the central security device generates a first target protection template based on the first statistical analysis information (the first target protection template can also be referred to as a first target security template or a first target guard template); where the first target protection template includes a security protection strategy generated based on the first statistical analysis information.

Upon receiving the first statistical analysis information, the central security device 11 can generate a security protection strategy based on the first statistical analysis information. For example, if the first statistical analysis information indicates that a large number of type A virus attack events have occurred on the edge security device 12, a security protection strategy for protecting against the type A virus attack event can be generated to avoid the type A virus attack. For another example, if the first statistical analysis information indicates that a large number of port vulnerability attack events have occurred on the edge security device 12, a security protection strategy for protecting against the port vulnerability attack event can be generated to avoid the port vulnerability attack event.

Upon obtaining the security protection strategy (which can be one or more security protection strategies), the central security device 11 can add the security protection strategy to the protection template, and the protection template having the security protection strategy added in can be the first target protection template. The protection template to which the security protection strategy is added can be a first initial protection template (introduced in subsequent examples), can be a default protection template (set based on actual experience and is a preset default protection template), or can be an empty protection template (there is no content in the empty protection template), or can be the first target protection template issued last time, which is not limited herein.

As an example, since there are a large number of edge security devices 12 in the IoT, the central security device 11 can obtain the first statistical analysis information of the large number of edge security devices 12, and the central security device 11 can aggregate the first statistical analysis information to generate a first target protection template applicable to the plurality of edge security devices 12, particularly, issuing the same first target protection template to the plurality of edge security devices 12.

For example, based on the first statistical analysis information of the plurality of edge security devices 12 in the same category (such as the same device type, the same processor type, the same operating system type, etc., hereinafter referred to as category 1), the central security device 11 learns that type A virus attack events occur on all these edge security devices 12, which means that edge security devices of category 1 are vulnerable to type A virus attacks. Therefore, a first target protection template is generated for category 1, and transmitted to all the edge security devices 12 of category 1.

The above process is just an example of how the central security device 11 generates the first target protection template. For this generation method, the content of the first target protection template is not limited herein. Upon obtaining the first target protection template, the central security device 11 can transmit the first target protection template to the edge security devices 12.

At block 204, the first target protection template transmitted by the central security device is received.

At block 205, the edge security device performs protection based on the security protection strategy in the first target protection template. Upon obtaining the first target protection template, the edge security device 12 can run the first target protection template on the edge security device itself, thereby protecting the edge security device based on the security protection strategy in the first target protection template.

During the process of protecting the edge security device 12 based on the security protection strategy in the first target protection template, the edge security device 12 performs blocks 201-205 again to obtain a new first target protection template and replace the existing first target protection template with the new first target protection template, and the edge security device 12 performs protection based on the new first target protection template, and so on, so as to keep updating the first target protection template.

In the above method, the edge security device is protected based on the first target protection template, thereby protecting the data security of the edge security device, and preventing an attacker from obtaining user's privacy data from the edge security device. The edge security device performs statistical analysis on the plurality of pieces of first security event information, so that the computing resources of the edge security device, instead of the computing resources of the central security device, are used for statistical analysis, thereby decentralizing a large number of statistical analysis operations to the edge security device, saving the computing resources of the central security device.

In some examples, in a possible implementation, prior to block 201, if the edge security device 12 is not configured with the first target protection template, in order to protect the security of the edge security device 12, the following blocks can be performed. The edge security device 12 transmits a first template request to the central security device 11, and the first template request includes a first category of the edge security device 12. The central security device 11 determines a first initial protection template corresponding to the first category (the first initial protection template can also be referred to as a first initial security template or a first initial guard template), and transmits the first initial protection template to the edge security device 12. Upon receiving the first initial protection template, the edge security device 12 protects the edge security device 12 itself based on the first initial protection template.

The first category can include but is not limited to at least one of the following: device type (such as manufacturer information, device model, etc.), processor type, operating system type, or the like. The first category is not limited herein.

The central security device 11 can maintain a mapping relationship table between categories and initial protection templates, as shown in Table 1. In Table 1, the category indicates device type+processor type+operating system type. After the central security device 11 obtains the first category of the edge security device 12, if the first category exists in the mapping relationship table, the first initial protection template corresponding to the first category can be retrieved from the mapping relationship table. If the first category does not exist in the mapping relationship table, a default protection template (i.e., a preset default protection template, which is preset based on actual experience) can be used as the first initial protection template corresponding to the first category.

TABLE 1

| Type | Initial Protection Template |
| --- | --- |
| Type A1 | Initial Protection Template 1 |
| Type A2 | Initial Protection Template 2 |
| ... | ... |

Upon receiving the first initial protection template, the edge security device 12 runs the first initial protection template on the edge security device itself. Since the first initial protection template includes a security protection strategy for protecting the edge security device 12, the edge security device 12 can protect the device itself based on the first initial protection template.

In the process of protecting the edge security device based on the first initial protection template, blocks 201-205 are performed to obtain a first target protection template, and replace the existing first initial protection template with the first target protection template.

In summary, before obtaining protection with the first target protection template, the edge security device 12 can be protected based on the first initial protection template to avoid a situation that the edge security device 12 is in an unprotected state for a certain period of time, and to avoid potential security hazards for the edge security device 12.

In some examples, in a possible implementation, the edge security device can also obtain a plurality of pieces of first traffic information generated during operation of the edge security device; perform statistical analysis on the plurality of pieces of first traffic information to obtain second statistical analysis information and transmit the second statistical analysis information to the central security device, so that the central security device generates a traffic control strategy based on the second statistical analysis information.

As an example, during the operation of the edge security device 12, all or part of the traffics of the edge security device 12 (such as the traffic transmitted from the edge security device 12 and the traffic received by the edge security device 12, etc.) can be monitored and information on the traffics can be collected. For convenience of distinguishing, the information on the traffics is referred to as first traffic information. For example, the first traffic information includes a source IP address, a destination IP address, an application type, a number of data packets per minute, a protocol type, and so on. The first traffic information is not limited herein.

Upon obtaining the plurality of pieces of first traffic information, the edge security device 12 performs statistical analysis on the plurality of pieces of first traffic information to obtain second statistical analysis information, and the statistical analysis process is not limited herein. For example, statistics on a traffic volume corresponding to an application type, statistics on a traffic volume corresponding to an IP address, etc., is performed. For example, based on the traffic volume corresponding to the application type, whether there is an abnormality in an application of the application type can be analysed; based on the traffic volume corresponding to the IP address, whether the IP address is an attacker can be analysed, and so on. Of course, the above are just a few examples, which are not limited herein, and all statistical and analysis operations based on the first traffic information are within the scope of the present disclosure.

Upon receiving the second statistical analysis information, the central security device 11 generates a traffic control strategy based on the second statistical analysis information. For example, if the second statistical analysis information indicates that there is an abnormality in an application of application type A, such as transmitting a large amount of traffic in a short time, a traffic control strategy for transmission rate limiting of the application of the application type A is generated, and the traffic control strategy is transmitted to the edge security device 12, so that the edge security device 12 performs transmission rate limiting on the application of the application type A based on the traffic control strategy, to avoid the application of the application type A occupying a large amount of bandwidth.

For another example, if the second statistical analysis information indicates that the IP address A is an attacker, a traffic control strategy is generated, and the traffic control strategy is used to screen out packets having the IP address A as the source IP address. The traffic control strategy is transmitted to the edge security device, such as the first edge security device of the IoT which the IP address A accesses to. When the edge security device receives a packet having the IP address A as the source IP address, the edge security device screens out the packet based on the traffic control strategy to prevent the packet from being transmitted to the IoT.

As an example, since there are a large number of edge security devices 12 in the IoT, the central security device 11 can obtain a plurality of pieces of second statistical analysis information of the large number of edge security devices 12. Then, the central security device 11 can aggregate the plurality of pieces of second statistical analysis information and generate a traffic control strategy based on the plurality of pieces of second statistical analysis information.

For example, based on the second statistical analysis information of a certain edge security device 12, it is learned that there is no abnormality for the application of the application type A, but based on the pieces of second statistical analysis information of a plurality of edge security devices 12, it is learned that there is abnormality for the application of the application type A. Then, a traffic control strategy for transmission rate limiting of the application of the application type A is generated. For another example, based on the second statistical analysis information of an edge security device 12, it is learned that the IP address A is not an attacker, but, based on the pieces of second statistical analysis information of the plurality of edge security devices 12, it is learned that the IP address A is an attacker. Then, a traffic control policy for screening out packets having the IP address A as the source IP address can be generated.

Figure 3:
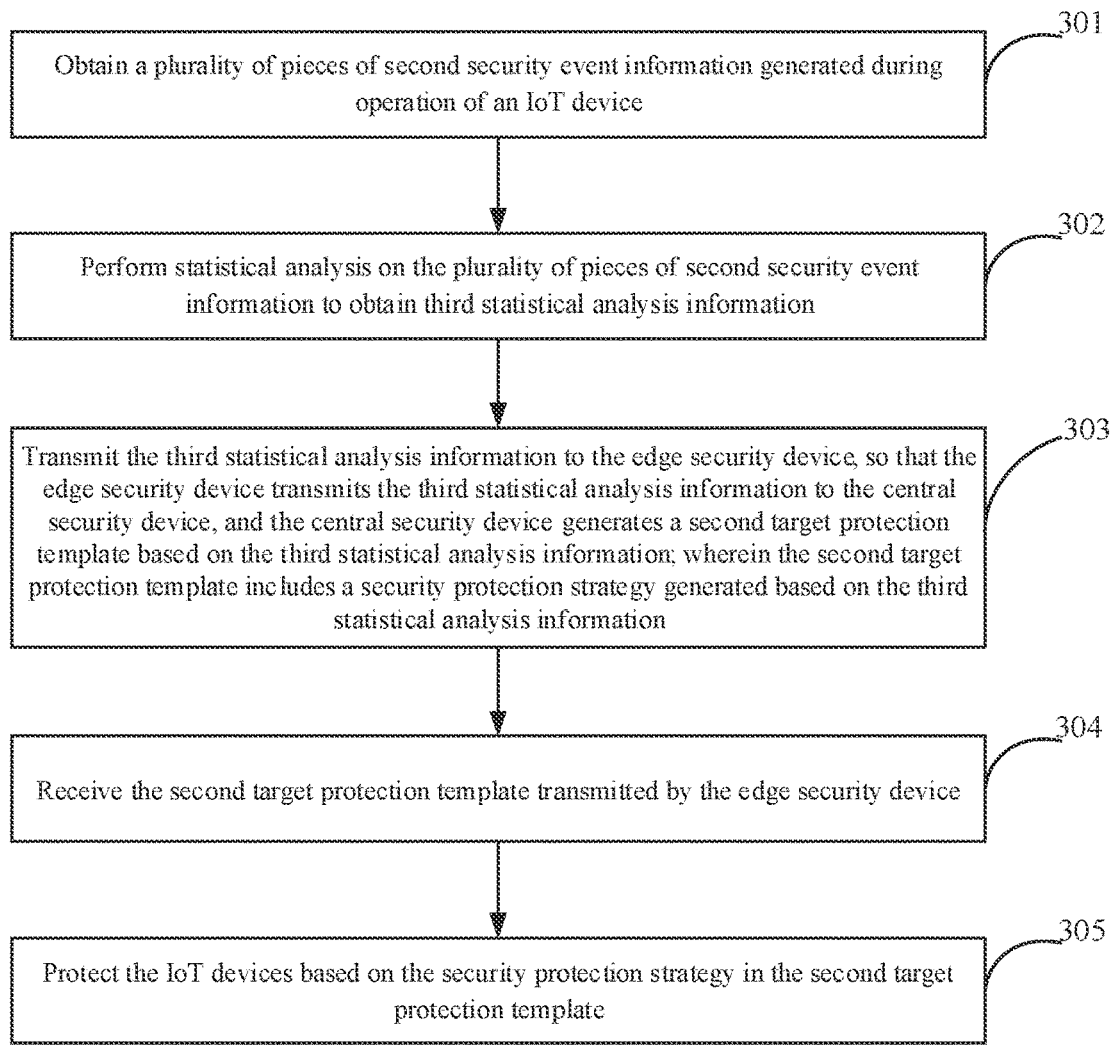
FIG. 3 is a flowchart illustrating a method of protecting a device in another example of the present disclosure.

Example 2. An example of the present disclosure provides a method of protecting a device. Referring to FIG. 3, FIG. 3 is a schematic flowchart illustrating a method of protecting a device. The method is applied to an IoT device. The method can include the following blocks.

At block 301, a plurality of pieces of second security event information generated during operation of the IoT device are obtained.

At block 302, statistical analysis is performed on the plurality of pieces of second security event information to obtain third statistical analysis information.

As an example, during the operation of the IoT device 13, all or part of security events occurring on the IoT device 13 can be monitored, and information on these security events can be collected, and the information on these security events can be referred to as second security event information. Upon obtaining the plurality of pieces of second security event information, the IoT device 13 performs statistical analysis on the plurality of pieces of second security event information to obtain third statistical analysis information.

At block 303, the third statistical analysis information is transmitted to an edge security device, so that the edge security device transmits the third statistical analysis information to the central security device, and the central security device generates a second target protection template (also referred to as a second target security template or a second target guard template); where the second target protection template includes a security protection strategy generated based on the third statistical analysis information.

The edge security device 12 can obtain the third statistical analysis information of the IoT device 13 and transmit the third statistical analysis information to the central security device 11. As an example, since the edge security device 12 can obtain pieces of third statistical analysis information of the plurality of IoT devices 13, the edge security device 12 can transmit each piece of third statistical analysis information to the central security device 11, or, aggregate the pieces of third statistical analysis information, and transmit one aggregated piece of third statistical analysis information to the central security device 11.

When the plurality of pieces of third statistical analysis information are aggregated, data can be aggregated, duplicate contents can be removed, invalid content can be screened out, non-duplicate contents can be merged, and so on. This is not limited herein. For example, if one piece of third statistical analysis information includes 10 times of port vulnerability attack events and another piece of third statistical analysis information includes 15 times of port vulnerability attack events, the aggregated third statistical analysis information includes 25 times of port vulnerability attack events. For another example, if one piece of third statistical analysis information includes s1 and s2, and another piece of third statistical analysis information includes s2 and s3, the aggregated third statistical analysis information includes s1, s2, and s3. Of course, the above is just an example of aggregating information, and this is not limited herein.

Upon receiving the third statistical analysis information, the central security device 11 generates a security protection strategy based on the third statistical analysis information, and adds the security protection strategy to the protection template (such as the second initial protection template, or the default protection template, or the second target protection template issued last time, and the like), to obtain second target protection template As an example, since there are a large number of IoT devices 13 in the IoT, the central security device 11 can receive a plurality of pieces of third statistical analysis information from the plurality of edge security devices 12 and aggregate the plurality of pieces of third statistical analysis information to generate a second target protection template suitable for the plurality of IoT devices 13, particularly, issuing the same second target protection template to the plurality of edge security devices 12. For each edge security device 12, a second target protection template can be transmitted to the plurality of IoT devices 13 corresponding to the edge security device 12.

At block 304, the second target protection template transmitted by the edge security device is received.

At block 305, the IoT device is protected based on the security protection strategy in the second target protection template.

Upon obtaining the second target protection template, the central security device 11 transmits the second target protection template to the edge security device 12. Upon receiving the second target protection template, the edge security device 12 transmits the second target protection template to the IoT device 13. Upon obtaining the second target protection template, the IoT device 13 runs the second target protection template, and protects the IoT device itself based on the security protection strategy in the second target protection template.

In the process of the IoT device 13 protecting the IoT device itself based on the security protection strategy in the second target protection template, blocks 301-305 are to be performed again to obtain a new second target protection template and replace the existing second target protection template with the new second target protection template, and protect the IoT device 13 based on the new second target protection template, and so on, so as to keep updating the second target protection template.

In the above method, the IoT device is protected based on the second target protection template, thereby protecting the data security of the IoT device, and preventing an attacker from obtaining user's privacy data from the IoT device. Statistical analysis is performed on the plurality of pieces of second security event information by the IoT device, so as to use the computing resources of the IoT device, instead of the computing resources of the central security device for statistical analysis, thus decentralizing a large number of statistical analysis operations to the IoT devices, saving the computing resources of the central security device.

In some examples, in a possible implementation, prior to block 301, if the IoT device 13 is not configured with the second target protection template, in order to protect the security of the IoT device 13, the following blocks can be performed. The IoT device 13 transmits a second template request to the edge security device 12, and the second template request includes a second category of the IoT device 13. The edge security device 12 obtains a second initial protection template corresponding to the second category, and transmits the second initial protection template to the IoT device 13. Upon receiving the second initial protection template, the IoT device 13 protects the IoT device 13 itself based on the second initial protection template.

The second category can include, but is not limited to, at least one of the following: the device type of the IoT device 13 (such as manufacturer information, device model, etc.), processor type, operating system type, and so on, which is not limited herein.

Upon receiving the second template request transmitted by the IoT device 13, the edge security device 12 can determine whether the edge security device 12 itself has a second initial protection template corresponding to the second category.

If the edge security device 12 has a second initial protection template corresponding to the second category, the edge security device 12 directly transmits the second initial protection template to the IoT device 13 without transmitting the second template request to the central security device 11, and in particular, for each second category, the edge security device 12 only has to request for the second initial protection template to the central security device 11 once.

If the edge security device 12 does not have a second initial protection template corresponding to the second category, the edge security device 12 transmits a second template request to the central security device 11, and upon receiving the second template request, the central security device 11 determines a second initial protection template corresponding to the second category, and transmits the second initial protection template to the edge security device 12. The edge security device 12 receives the second initial protection template transmitted by the central security device 11, stores a corresponding relationship between the second category and the second initial protection template in the edge security device itself, and transmits the second initial protection template to the IoT device 13.

The process of the central security device 11 determining the second initial protection template is similar to the process of the central security device 11 determining the first initial protection template, which will not be repeated herein.

In summary, the IoT device 13 can obtain the second initial protection template, run the second initial protection template on the IoT device itself, and protect the IoT device itself based on the second initial protection template. In the process of protecting the IoT device itself based on the second initial protection template, blocks 301-305 are performed to obtain a second target protection template, and replace the existing second initial protection template with the second target protection template.

In summary, before obtaining the protection with the second target protection template, the IoT device can be protected based on the second initial protection template to avoid potential security hazards to the IoT device.

In some examples, in a possible implementation, the IoT device can also obtain a plurality of pieces of second traffic information generated during the operation of the IoT device, and perform statistical analysis on the plurality of pieces of second traffic information to obtain fourth statistical analysis information and transmit the fourth statistical analysis information to the edge security device. The edge security device obtains the fourth statistical analysis information of the IoT device, and transmits the fourth statistical analysis information to the central security device, so that the central security device generates a traffic control strategy based on the fourth statistical analysis information.

As an example, during the operation of the IoT device 13, all or part of the traffic of the IoT device 13 can be monitored, and information about the traffic, that is, second traffic information, can be collected. Upon obtaining the plurality of pieces of second traffic information, statistical analysis can be performed on the plurality of pieces of second traffic information to obtain fourth statistical analysis information.

The edge security device 12 can obtain pieces of fourth statistical analysis information of the plurality of IoT devices 13, and transmit each piece of fourth statistical analysis information to the central security device 11, or aggregate the plurality of pieces of fourth statistical analysis information and transmit the aggregated fourth statistical analysis information to the central security device 11.

Upon receiving the fourth statistical analysis information, the central security device 11 generates a traffic control strategy based on the fourth statistical analysis information. For a specific generation method, reference can be made to the above examples, details of which will not be repeated herein.

Figure 4:
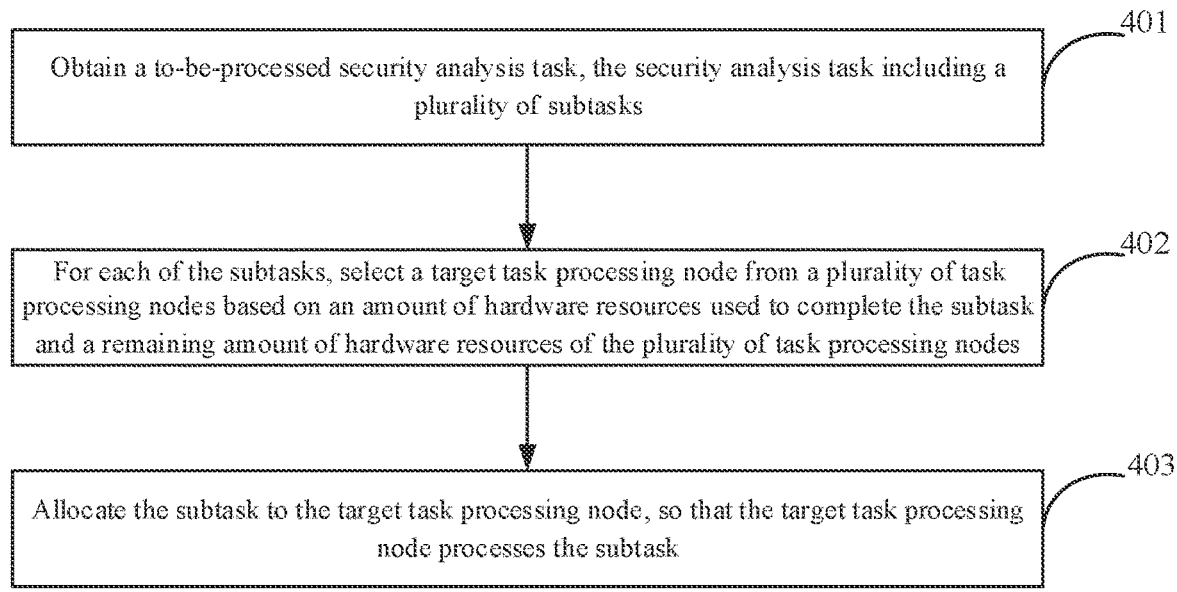
FIG. 4 is a flowchart illustrating a method of processing a task in an example of the present disclosure.

Example 3. Since both the edge security device 12 and the IoT device 13 have computing resources, in order to fully utilize these computing resources, the security analysis task can be allocated to the edge security device 12 and/or the IoT device 13 for processing. On this basis, an example of the present disclosure provides a method of processing a task. Referring to FIG. 4, FIG. 4 is a schematic flowchart illustrating a method of processing a task, which can be applied to an edge security device. The method includes the following blocks.

At block 401, a to-be-processed security analysis task is obtained, the security analysis task including a plurality of subtasks.

For example, the central security device 11 allocates the security analysis task to an edge security device 12 for processing, so that the edge security device 12 obtains the to-be-processed security analysis task. Alternatively, the user configures the security analysis task to an edge security device 12 for processing, so that the edge security device 12 obtains the to-be-processed security analysis task.

For security analysis tasks, the task can be an Intrusion Prevention System (IPS) type task, an Antivirus (AV) type task, or a Distributed denial of Service attack (DDoS) type task, which is not limited herein.

For the security analysis task, the security analysis task can be a collection of subtasks. Therefore, the security analysis task can be split into a plurality of subtasks, each subtask is the smallest execution unit, and each subtask can be executed separately. Different subtasks can be executed by different task processing nodes or by the same task processing node. By performing a plurality of subtasks, the security analysis task can be completed.

The security analysis task can also be an overall task, and be performed by one task processing node, for example, the edge security device 12, and the process will not be described in detail.

At block 402, for each subtask, a target task processing node is selected from a plurality of task processing nodes based on an amount of hardware resources used to complete the subtask and a remaining amount of hardware resources of the plurality of task processing nodes.

As an example, when selecting a target task processing node from a plurality of task processing nodes, the usage amount of hardware resources to complete the subtask needs to be less than the remaining amount of the hardware resources of the target task processing node. The hardware resources here can be processor resources, memory resources, disk storage space, network bandwidth, or the like, which in not limited herein. Taking processor resources as an example, assuming that the amount of hardware resources used to complete a subtask 1 is 500M, a remaining amount of hardware resources of a task processing node 1 is 600M, and a remaining amount of hardware resources of a task processing node 2 is 400M, then the task processing node 1 can be the target task processing node of the subtask 1.

The edge security device 12 can obtain the remaining amount of hardware resources of each task processing node, and there is no limitation on the obtaining method. For example, the task processing node provides its own remaining amount of hardware resources to the edge security device 12. The edge security device 12 can estimate the amount of hardware resources used to complete each subtask, and there is no limit to this estimation method. For example, the amount of hardware resources used to complete the subtask is estimated based on the calculation amount of the subtask.

At block 403, the subtask is allocated to the target task processing node, so that the target task processing node processes the subtask. For example, if the target task processing node selected for the subtask 1 is a task processing node 1, then the subtask 1 is allocated to the task processing node 1, and the task processing node 1 processes the subtask 1.

In a possible implementation, the plurality of task processing nodes can include: the edge security device 12, at least one IoT device 13 managed by the edge security device 12, that is, the at least one IoT device 13 belongs to the same security region as that of the instant edge security device 12. Alternatively, the plurality of task processing nodes can include: the edge security device 12, at least one IoT device 13 managed by the edge security device 12, and at least one IoT device managed by one or more edge security devices other than the edge security device 12, that is, an IoT device 13 that belongs to a different edge security region from that of the edge security device 12.

For a certain subtask 1, if the target task processing node of the subtask 1 is the edge security device 12, when the edge security device 12 has available computing resources, the edge security device 12 itself can process the subtask 1 with the available computing resources (the process of which is not limited herein), to obtain the task processing result of the subtask 1.

If the target task processing node of the subtask 1 is the IoT device 13 managed by the edge security device 12, the edge security device 12 itself allocates the subtask 1 to the IoT device 13, and the IoT device 13 receives the subtask 1 issued by the edge security device 12. If the IoT device 13 has available computing resources, the IoT device 13 itself will process the subtask 1 with the available computing resources to obtain the task processing result corresponding to the subtask 1 and transmit the task processing result of the subtask 1 to the edge security device 12.

If the target task processing node of the subtask 1 is an IoT device 13 managed by an edge security device other than the edge security device 12, the edge security device 12 allocates the subtask 1 to the IoT device 13, so that the IoT device 13 processes the subtask 1 with available computing resources.

After the above processing has been performed on each subtask, the edge security device 12 can obtain the task processing result of each subtask, and aggregate the task processing results of all the subtasks together to obtain the task processing result of the security analysis task, and transmit the task processing result of the security analysis task to the central security device 11.

In order to obtain the information of the IoT device 13 managed by one or more edge security devices other than the edge security device 12, the following method can be used. The edge security device 12 transmits a resource request to the one or more edge security devices other than the edge security device 12 itself, and receives resource responses returned by the one or more edge security devices in response to the resource request, where the resource responses can include address information of the at least one IoT device managed by the one or more edge security devices. Upon receiving a resource response, the edge security device 12 can determine the IoT device corresponding to the address information as a task processing node, and in particular, the edge security device 12 can allocate a subtask to the IoT device for processing.

As an example, when the computing resources of the edge security device 12 and the computing resources of the IoT devices 13 of a local edge security region to which the edge security device 12 belongs cannot meet the processing requirements of all the subtasks, the edge security device 12 can transmit a request message to the central security device 11. The central security device 11 can transmit information (such as address information) of one or more edge security devices other than the edge security device 12 to the edge security device 12, and based on the information of the one or more edge security devices, the edge security device 12 can transmit the above resource request to the one or more edge security devices.

Figure 5A:
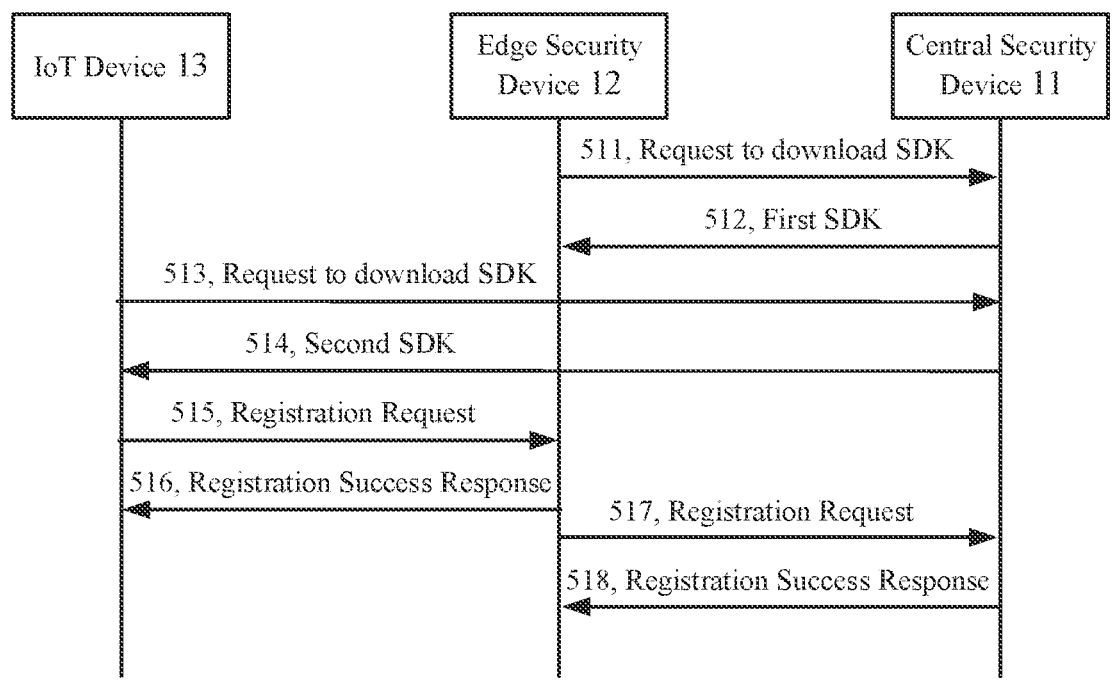
FIG. 5A is a schematic diagram illustrating a registration process in an example of the present disclosure.

Example 4. Refer to FIG. 5A, FIG. 5A is a registration process of the edge security device 12 and the IoT device 13.

At blocks 511-512, the edge security device 12 downloads a first Software Development Kit (SDK) from the central security device 11.

As an example, if the edge security device 12 allows its own computing resources to be shared, the edge security device 12 can download a first SDK from the central security device 11, and install the first SDK. The edge security device 12 implements the above statistical analysis work based on the first SDK, and in particular, the first SDK indicates how the statistical analysis work should be implemented.

At blocks 513-514, the IoT device 13 downloads a second SDK from the central security device 11.

As an example, if the IoT device 13 allows its own computing resources to be shared, the IoT device 13 can download a second SDK from the central security device 11 and install the second SDK.

At blocks 515-516, the IoT device 13 transmits a registration request to the edge security device 12, and the edge security device 12 transmits a registration success response to the IoT device 13, allowing the IoT device 13 to join the security edge region.

As an example, the IoT device 13 (such as through the second SDK) can transmit a registration request to the edge security device 12, and the registration request can include the IP address, MAC address, operating system type of the IoT device 13, and the maximum management computing capability (remaining amount of hardware resources) that can be used for security, security configuration information, or the like.

Upon receiving the registration request, the edge security device 12 allows the IoT device 13 to join the security edge region, records the information carried in the registration request, and transmits a registration success response to the IoT device 13.

Upon receiving the registration success response, the IoT device 13 learns that the IoT device 13 has joined the security edge region. Thus, the IoT device 13 can support statistical analysis and perform statistical analysis of security events and traffics.

At blocks 517-518, the edge security device 12 transmits a registration request to the central security device 11, and the central security device 11 transmits a registration success response to the edge security device 12, allowing the edge security device 12 to create a security edge region.

As an example, the edge security device 12 (such as through the first SDK) can transmit a registration request to the central security device 11, and the registration request can include the IP address, MAC address, operating system type of the edge security device 12, and the maximum computing capability (i.e., the sum of the remaining hardware resources of the edge security device 12 and the remaining hardware resources of all the IoT devices 13) available for security management, security configuration information, or the like.

After the central security device 11 receives the registration request, if the edge security device 12 is allowed to create a security edge region, the central security device 11 records the information carried in the registration request and transmits a registration success response to the edge security device 12. Upon receiving the registration success response, the edge security device 12 can create a security edge region, and the edge security device 12 can serve as a manager of the security edge region. Thus, the edge security device 12 can support statistical analysis and can perform statistical analysis of security events and traffic.

As an example, the central security device 11 can count a number of managers in a region where the edge security device 12 is located (which can be obtained by a division based on city or other strategies). If the number of managers is larger than a preset number threshold (configured based on experience), the edge security device 12 is not allowed to create a security edge region. If the number of managers is not larger than the preset number threshold, a score of the edge security device 12 is determined. If the score is higher than a preset score threshold (configured based on experience), the edge security device 12 is allowed to create a security edge region. If the score is not higher than the preset score threshold, the edge security device 12 is not allowed to create a security edge region.

Here, the central security device 11 can determine the score of the edge security device 12 based on the maximum computing capability of the edge security device 12 that can be used for security management, the security configuration information of the edge security device 12, and the like. For example, the score can be the maximum computing capability*70%+security evaluation level*30%. The security evaluation level is determined based on the security configuration information. Of course, the above is only an example, and there is no limitation on this.

Figure 5B:
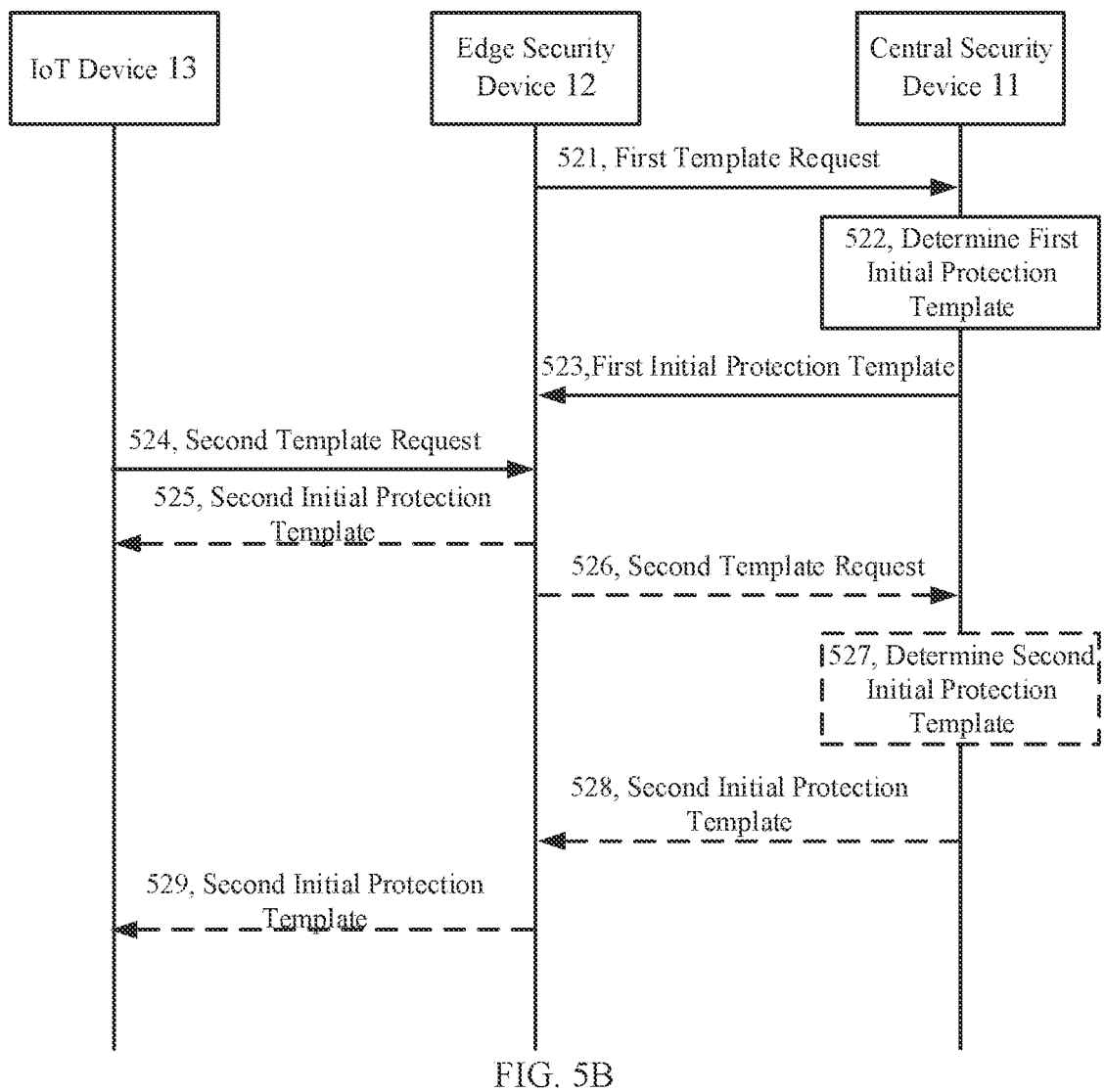
FIG. 5B is a schematic diagram illustrating transmission of an initial protection template in an example of the present disclosure.

Example 5. During a security initialization process of the edge security device 12 and of the IoT device 13, an initial protection template needs to be issued to the edge security device 12 and the IoT device 13, as shown in FIG. 5B.

At blocks 521-523, the edge security device 12 transmits a first template request to the central security device 11, and the first template request includes the first category of the edge security device 12. The central security device 11 determines the first initial protection template corresponding to the first category, and transmits the first initial protection template to the edge security device 12.

At blocks 524-525, the IoT device 13 transmits a second template request to the edge security device 12, and the second template request includes the second category of the IoT device 13. If the edge security device 12 has a second initial protection template corresponding to the second category, the edge security device 12 transmits the second initial protection template to the IoT device 13.

At blocks 526-529, if the edge security device 12 does not have the second initial protection template corresponding to the second category, the edge security device 12 transmits the second template request to the central security device 11. The central security device 11 determines a second initial protection template corresponding to the second category, and transmits the second initial protection template to the edge security device 12. The edge security device 12 transmits the second initial protection template to the IoT device 13.

Figure 5C:
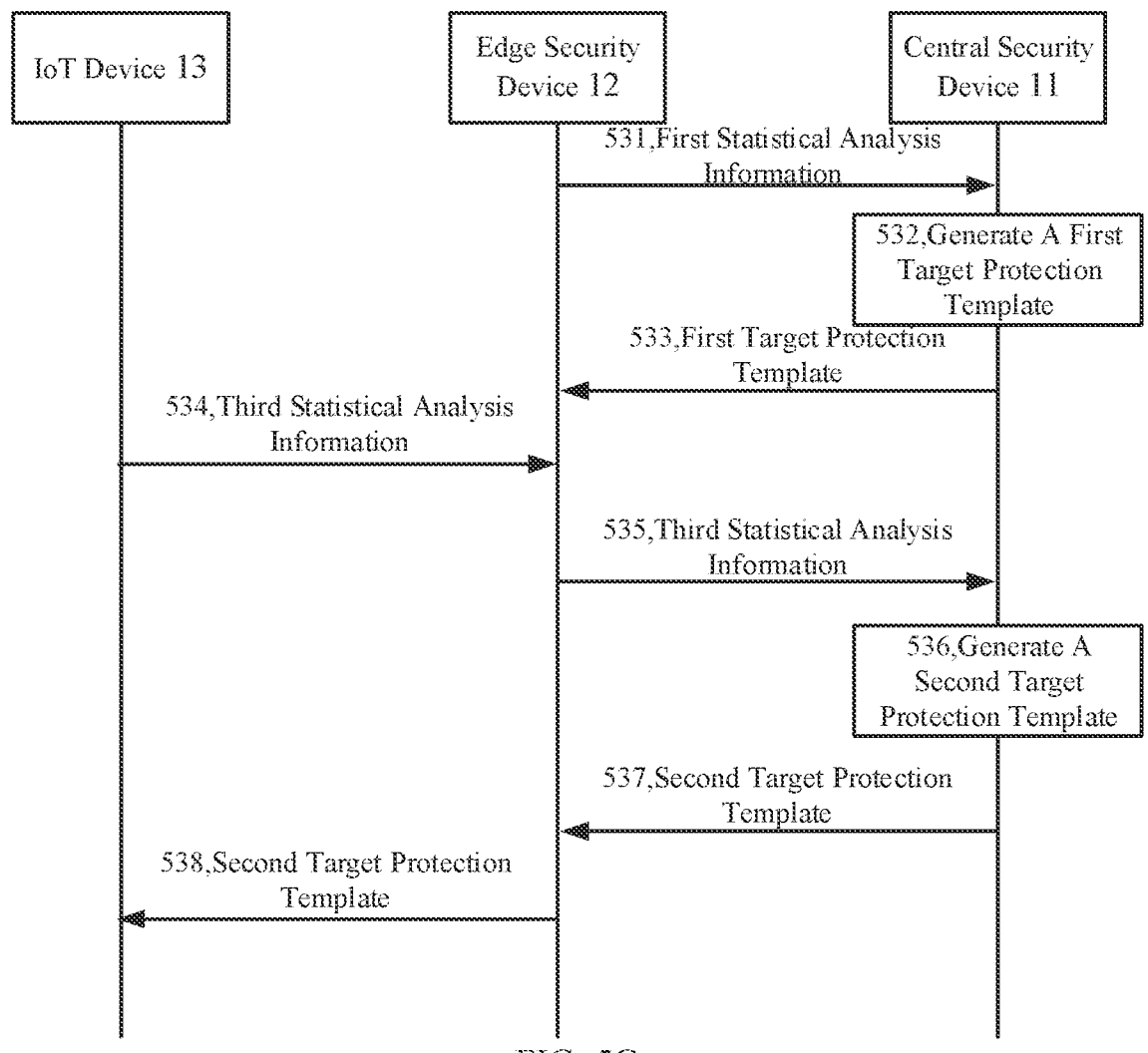
FIG. 5C is a schematic diagram illustrating transmission of a template protection template in an example of the present disclosure.

Example 6. During the operation of the edge security device 12 and the IoT device 13, the target protection template can be issued to the edge security device 12 and the IoT device 13, as shown in FIG. 5C.

At blocks 531-533, the edge security device 12 performs statistical analysis on the first security event information generated in the operation process of the edge security device 12, obtains first statistical analysis information, and transmits the first statistical analysis information to the central security device 11. The central security device 11 generates a first target protection template based on the first statistical analysis information, and transmits the first target protection template to the edge security device 12.

At blocks 534-538, the IoT device 13 performs statistical analysis on the second security event information generated in the operation process of the IoT device 13 to obtain third statistical analysis information, and transmits the third statistical analysis information to the edge security device 12. The edge security device 12 transmits the third statistical analysis information to the central security device 11. The central security device 11 generates a second target protection template based on the third statistical analysis information, transmits the second target protection template to the edge security device 12, and the edge security device 12 transmits the second target protection template to the IoT device 13.

Figure 5D:
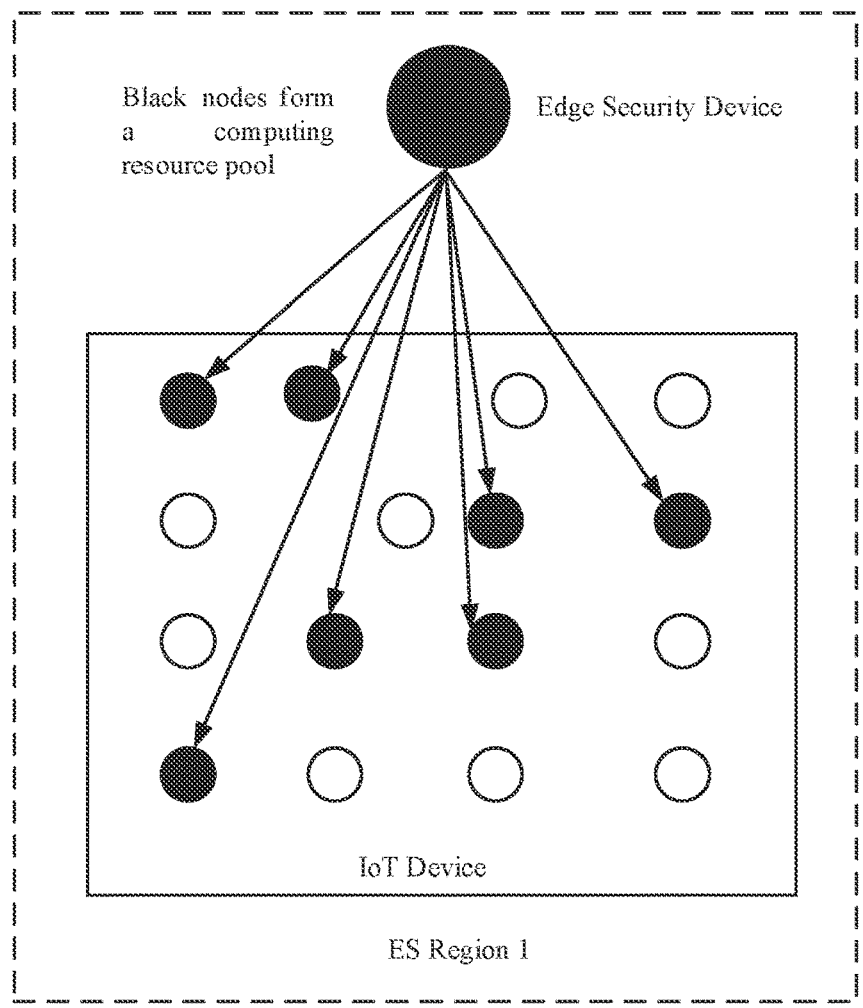
FIGS. 5D and 5E are schematic diagrams illustrating resource pools in an example of the present disclosure.

Example 7. As shown in FIG. 5D, the edge security device 12 and the IoT devices 13 in a local edge security region to which the edge security device 12 belongs can form a distributed computing resource pool, and this computing resource pool can process security analysis services. The edge security device 12 is responsible for resource management and task allocation. The IoT device 13 is a computing resource provider, shares idle computing resources thereof, becomes a member of the computing resource pool, and undertakes computing and analysis tasks. For example, the edge security device 12 obtains a to-be-processed security analysis task, and splits the security analysis task into a plurality of subtasks. For each subtask, the subtask is allocated to the edge security device 12 or the IoT device 13 for processing. After completing the processing of each subtask, the edge security device 12 can obtain the task processing result of each subtask, aggregate the task processing results of all subtasks together, obtain the task processing result of the security analysis task, and transmits the task processing result of the security analysis task to the central security device 11.

As an example, the edge security device 12 can also transmit a security analysis task that cannot be processed to the central security device 11, so that the central security device 11 processes the security analysis task.

Figure 5E:
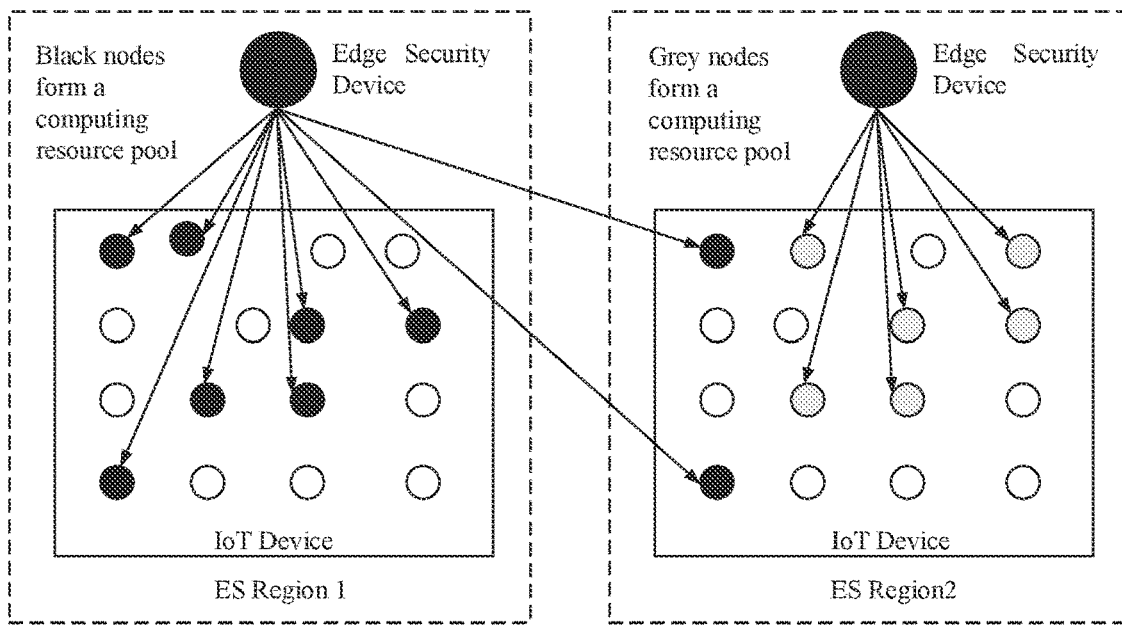

Example 8. As shown in FIG. 5E, the edge security device 12, the IoT devices 13 in a local edge security region to which the edge security device 12 belongs, and IoT devices 13 in a non-local edge security region can form a distributed computing resource pool.

As an example, when the available resources of an edge security region (for example, ES region 1) are insufficient, the edge security device 12 of the ES region 1 transmits a request message to the central security device 11. The central security device 11 can obtain information on available resource of each ES region (for example, each ES region periodically transmits information on available resources of its own to the central security device 11). Therefore, upon receiving the request message, the central security device 11 can select an ES region with more available resources (for example, ES region 2), and transmits the information on the edge security device of the ES region 2 to the edge security device 12 of the ES region 1.

Based on the information on the edge security device of the ES region 2, the edge security device 12 of the ES region 1 transmits a resource request to the edge security device of the ES region 2. The edge security device of the ES region 2 returns the address information of some IoT devices 13 to the edge security device 12 of the ES region 1 when the resources of the ES region 2 are sufficient, so that the computing resources of these IoT devices 13 become computing resources of the ES region 1. In particular, the computing resources of these IoT devices 13 can be added to the computing resource pool of the ES region 1, and the security analysis service can be processed based on the computing resource pool.

As an example, when the available resources of the ES region 1 are less than the preset threshold, the edge security device 12 of the ES region 1 transmits a request message to the central security device 11 to execute the above process. When the available resources of the ES region 1 are not less than the preset threshold, the ES region 1 can release the computing resources of the IoT devices 13 of the ES region 2, so that the computing resources of the IoT devices 13 of the ES region 2 are returned to the ES region 2.

Based on the same application concept as the above method, an example of the present disclosure also provides an apparatus for protecting a device, which is applied to an edge security device. The apparatus for protecting a device can include: an obtaining module configured to obtain a plurality of pieces of first security event information generated during operation of an edge security device; an analysing module configured to perform statistical analysis on the plurality of pieces of first security event information to obtain first statistical analysis information; a transmitting module configured to transmit the first statistical analysis information to the central security device, so that the central security device generates a first target protection template based on the first statistical analysis information; wherein the first target protection template includes a security protection strategy generated based on the first statistical analysis information; a receiving module configured to receive the first target protection template transmitted by the central security device; and a protecting module configured to protect the edge security device based on the security protection strategy in the first target protection template.

In some examples, in a possible implementation, the transmitting module is further configured to transmit a first template request to the central security device, wherein the first template request includes a first category of the edge security device so that the central security device determines a first initial protection template corresponding to the first category; the receiving module is further configured to receive the first initial protection template transmitted by the central security device; and the protecting module is further configured to protect the edge security device based on the first initial protection template.

In some examples, in a possible implementation, the obtaining module is further configured to obtain a plurality of pieces of first traffic information generated during operation of the edge security device; the analysing module is further configured to perform statistical analysis on the plurality of pieces of first traffic information to obtain second statistical analysis information; the transmitting module is further configured to transmit the second statistical analysis information to the central security device, so that the central security device generates a traffic control strategy based on the second statistical analysis information.

In some examples, in a possible implementation, the obtaining module is further configured to obtain a to-be-processed security analysis task, the security analysis task including a plurality of subtasks; for each subtask, select a target task processing node from a plurality of task processing nodes based on an amount of hardware resources used to complete the subtask and a remaining amount of hardware resources of the plurality of task processing nodes; allocate the subtask to the target task processing node, so that the target task processing node processes the subtask, wherein the plurality of task processing nodes include: the edge security device, at least one IoT device managed by the edge security device; alternatively, the edge security device, at least one IoT device managed by the edge security device, and at least one IoT device managed by one or more edge security devices other than the edge security device.

Based on the same application concept as the above method, an example of the present disclosure also provides an apparatus for protecting a device, which is applied to an IoT device. The apparatus for protecting a device can include: an obtaining module configured to obtain a plurality of pieces of second security event information generated during operation of the IoT device; an analysing module configured to perform statistical analysis on the plurality of pieces of second security event information to obtain third statistical analysis information; a transmitting module configured to transmit the third statistical analysis information to the edge security device, so that the edge security device transmits the third statistical analysis information to the central security device, and the central security device generates a second target protection template based on the third statistical analysis information; wherein the second target protection template includes a security protection strategy generated based on the third statistical analysis information; a receiving module configured to receive the second target protection template transmitted by the edge security device; and a protecting module configured to protect the IoT device based on the security protection strategy in the second target protection template.

In some examples, in a possible implementation, the transmitting module is further configured to transmit a second template request to the edge security device, wherein the second template request includes a second category of the IoT device so that the edge security device obtains a second initial protection template corresponding to the second category; the receiving module is further configured to receive the second initial protection template transmitted by the edge security device; and the protecting module is further configured to protect the IoT device based on the second initial protection template.

In some examples, in a possible implementation, the obtaining module is further configured to obtain a plurality of pieces of second traffic information generated during operation of the IoT device; the analysing module is further configured to perform statistical analysis on the plurality of pieces of second traffic information to obtain fourth statistical analysis information; the transmitting module is further configured to transmit the fourth statistical analysis information to the edge security device, so that the edge security device transmits the fourth statistical analysis information to the central security device, and the central security device generates a traffic control strategy based on the fourth statistical analysis information.

Figure 6:
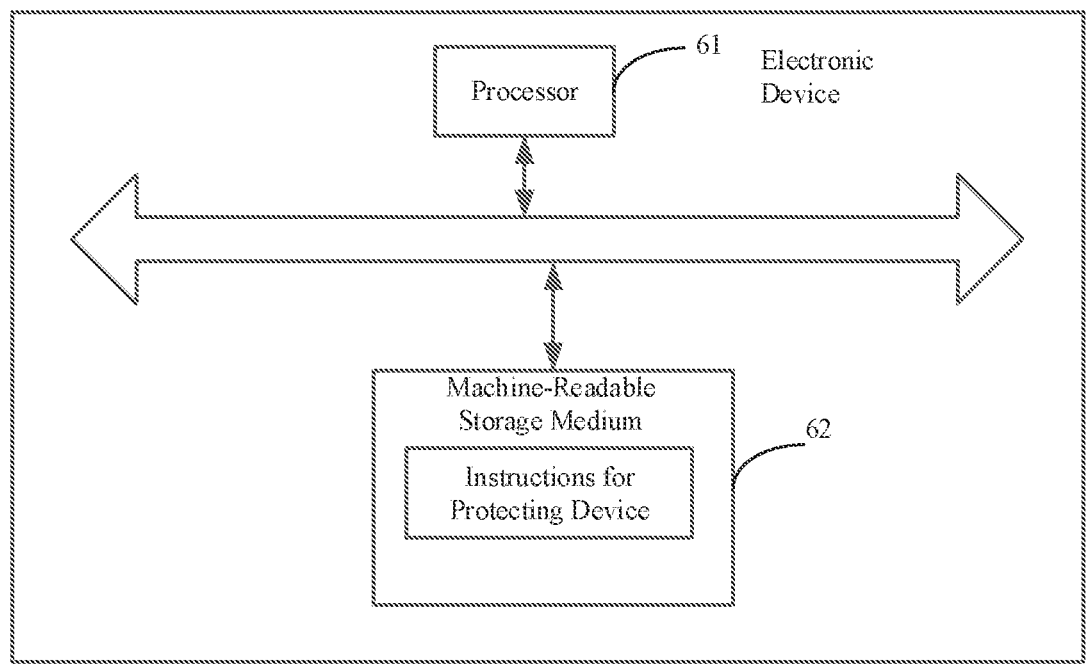
FIG. 6 is a hardware configuration diagram illustrating an electronic device in an example of the present disclosure.

Based on the same application concept as the above method, an example of the present disclosure also provides an electronic device (such as an edge security device or an IoT device). The electronic device provided in the example of the present disclosure, from the hardware level, has a hardware architecture shown in FIG. 6.

The electronic device can include: a processor 61 and a machine-readable storage medium 62 that stores machine-executable instructions that can be executed by the processor 61; the processor 61 is configured to execute the machine-executable instructions to implement the method disclosed in the above examples of the present disclosure.

For example, when the electronic device is an edge security device, the processor 61 is configured to execute the machine-executable instructions to implement the following blocks: obtaining a plurality of pieces of first security event information generated during operation of an edge security device; performing statistical analysis on the plurality of pieces of first security event information to obtain first statistical analysis information; transmitting the first statistical analysis information to the central security device, so that the central security device generates a first target protection template based on the first statistical analysis information; wherein the first target protection template includes a security protection strategy generated based on the first statistical analysis information; receiving the first target protection template transmitted by the central security device; and protecting the edge security device based on the security protection strategy in the first target protection template.

For another example, when the electronic device is an IoT device, the processor 61 is configured to execute the machine-executable instructions to implement the following blocks: obtaining a plurality of pieces of second security event information generated during operation of the IoT device; performing statistical analysis on the plurality of pieces of second security event information to obtain third statistical analysis information; transmitting the third statistical analysis information to the edge security device, so that the edge security device transmits the third statistical analysis information to the central security device, and the central security device generates a second target protection template based on the third statistical analysis information; wherein the second target protection template includes a security protection strategy generated based on the third statistical analysis information; receiving the second target protection template transmitted by the edge security device; and protecting the IoT devices based on the security protection strategy in the second target protection template.

Based on the same application concept as the above method, examples of the present disclosure also provide a machine-readable storage medium, wherein some computer instructions are stored in the machine-readable storage medium, and when the computer instructions are executed by a processor, the method disclosed in the above example of the present disclosure can be implemented.

As an example, the above machine-readable storage medium can be any electronic, magnetic, optical, or other physical storage device, and can contain or store information, such as executable instructions, data, and so on. For example, the machine-readable storage medium can be: Radom Access Memory (RAM), volatile memory, non-volatile memory, flash memory, storage drive (such as a hard disk drive), solid-state drive, any type of storage (such as optical discs, DVDs, etc.), or similar storage media, or a combination of them.

The system, apparatus, module or unit explained in the above examples can be specifically implemented by a computer chip or entity, or by a product having a certain function. A typical implementation device is a computer, and the specific form of the computer can be a personal computer, a laptop computer, a cellular phone, a camera phone, a smart phone, a personal digital assistant, a media player, a navigation device, an email transmitting and receiving device, and a game console, a tablet computer, a wearable device, or any combination of these devices.

For convenience of description, in order to describe the above device, the above device is divided into various units by function and the functions corresponding to the units are described separately. Of course, when implementing the present disclosure, the functions of each unit can be implemented in one or more software and/or hardware.

Those skilled in the art should understand that the examples of the present disclosure can be provided as methods, systems, or computer program products. Therefore, the present disclosure can take the form of an entirely hardware example, an entirely software example, or an example combining software and hardware. Moreover, the examples of the present disclosure can take the form of computer program products implemented on one or more computer usable storage media (including but not limited to disk storage, CD-ROM, optical storage, etc.) containing computer usable program code.

The present disclosure is described with reference to flowcharts and/or block diagrams of methods, of devices (systems), and of computer program products based on examples of the application. It should be understood that each block in the flowchart and/or each block in the block diagram and a combination of the blocks in the flowchart and/or blocks in the block diagram can be implemented by computer program instructions. These computer program instructions can be provided to the processor of a general-purpose computer, of a special-purpose computer, of an embedded processing machine, or of other programmable data processing device to produce a machine, so that the instructions executed by a processor of a computer or other programmable data processing device can produce an apparatus that can implement a function specified in one or more blocks in a flowchart and/or one or more blocks in a block diagram.

Moreover, these computer program instructions can also be stored in a computer readable memory that can guide a computer or other programmable data processing device to operate in a specific manner, so that the instructions stored in the computer readable memory produce an article of manufacture including instructions that implement the function specified in one or more blocks in a flowchart and/or one or more blocks in a block diagram.

The above is only an example of the present disclosure, and is not intended to limit the present disclosure. For those skilled in the art, the present disclosure can have various modifications and changes. Any modification, equivalent substitution, improvement, etc. made within the spirit and principle of the present disclosure shall be included in the scope of the claims of the present disclosure.

The invention claimed is:

1. A method of protecting a device, applied to an edge security device, the method comprising:
   obtaining a plurality of pieces of first security event information generated during operation of the edge security device;
   performing statistical analysis on the plurality of pieces of first security event information to obtain first statistical analysis information;
   transmitting the first statistical analysis information to a central security device, so that the central security device generates a first target protection template based on the first statistical analysis information; wherein the first target protection template includes a security protection strategy generated based on the first statistical analysis information;
   receiving the first target protection template transmitted by the central security device; and
   protecting the edge security device based on the security protection strategy in the first target protection template, wherein the method further comprises:
obtaining a to-be-processed security analysis task, the security analysis task including a plurality of subtasks;
for each of the subtasks,
selecting a target task processing node from a plurality of task processing nodes based on an amount of hardware resources used to complete the subtask and a remaining amount of hardware resources of the plurality of task processing nodes;
allocating the subtask to the target task processing node, so that the target task processing node processes the subtask,
wherein the plurality of task processing nodes include: the edge security device, at least one IoT device managed by the edge security device; or, the edge security device, at least one IoT device managed by the edge security device, and at least one IoT device managed by one or more edge security devices other than the edge security device.

2. The method according to claim 1, wherein before obtaining the plurality of pieces of first security event information generated during operation of the edge security device, the method further comprises:
transmitting a first template request to the central security device, wherein the first template request includes a first category of the edge security device so that the central security device determines a first initial protection template corresponding to the first category;
receiving the first initial protection template transmitted by the central security device; and
protecting the edge security device based on the first initial protection template.

3. The method according to claim 1, further comprising:
obtaining a plurality of pieces of first traffic information generated during operation of the edge security device;
performing statistical analysis on the plurality of pieces of first traffic information to obtain second statistical analysis information; and
transmitting the second statistical analysis information to the central security device, so that the central security device generates a traffic control strategy based on the second statistical analysis information.

4. The method according to claim 1, further comprising:
obtaining third statistical analysis information of an Internet of Things (IoT) device, wherein the third statistical analysis information is obtained by the IoT device performing statistical analysis on a plurality of pieces of second security event information generated during operation of the IoT device;
transmitting the third statistical analysis information to the central security device, so that the central security device generates a second target protection template based on the third statistical analysis information; wherein the second target protection template includes a security protection strategy generated based on the third statistical analysis information;
receiving the second target protection template transmitted by the central security device; and
transmitting the second target protection template to the IoT device, so that the IoT device protects the IoT device based on the security protection strategy in the second target protection template.

5. The method according to claim 4, wherein
before obtaining the third statistical analysis information of the IoT device, the method further comprises:
receiving a second template request transmitted by the IoT device, the second template request including a second category of the IoT device, and determining whether the edge security device has a second initial protection template corresponding to the second category;
when the edge security device has a second initial protection template corresponding to the second category, transmitting the second initial protection template to the IoT device; and
when the edge security device does not have a second initial protection template corresponding to the second category, transmitting the second template request to the central security device, so that the central security device determines a second initial protection template corresponding to the second category; receiving the second initial protection template transmitted by the central security device, storing a correspondence relationship between the second category and the second initial protection template in the edge security device, and transmitting the second initial protection template to the IoT device.

6. The method according to claim 4, further comprising:
obtaining fourth statistical analysis information of the IoT device, wherein the fourth statistical analysis information is obtained by the IoT device performing statistical analysis on a plurality of pieces of second traffic information generated during operation of the IoT device; and
transmitting the fourth statistical analysis information to the central security device, so that the central security device generates a traffic control strategy based on the fourth statistical analysis information.

7. The method according to claim 1, wherein
before selecting the target task processing node from the plurality of task processing nodes based on the amount of hardware resources used to complete the subtask and the remaining amount of hardware resources of the plurality of task processing nodes, the method further comprises:
transmitting a resource request to one or more edge security devices other than the edge security device, and receiving resource responses returned by the one or more edge security devices in response to the resource request, the resource responses including address information of at least one IoT device managed by the one or more edge security devices; and
determining an IoT device corresponding to the address information as a task processing node.

8. A method of protecting a device, applied to an Internet of Things device (IoT), the method comprising:
obtaining a plurality of pieces of second security event information generated during operation of the IoT device;
performing statistical analysis on the plurality of pieces of second security event information to obtain third statistical analysis information;
transmitting the third statistical analysis information to an edge security device, so that the edge security device transmits the third statistical analysis information to a central security device, and the central security device generates a second target protection template based on the third statistical analysis information; wherein the second target protection template includes a security protection strategy generated based on the third statistical analysis information;
receiving the second target protection template transmitted by the edge security device; and
protecting the IoT device based on the security protection strategy in the second target protection template,
wherein the method further comprises:
receiving a subtask issued by the edge security device; when the IoT device has available computing resources, processing the subtask with the available computing resources to obtain a task processing result corresponding to the subtask; and
transmitting the task processing result to the edge security device.

9. The method according to claim 8, wherein before obtaining the plurality of pieces of second security event information generated during operation of the IoT device, the method further comprises:
transmitting a second template request to the edge security device, wherein the second template request includes a second category of the IoT device so that the edge security device obtains a second initial protection template corresponding to the second category;
receiving the second initial protection template transmitted by the edge security device; and
protecting the IoT device based on the second initial protection template.

10. The method according to claim 8, further comprising:
obtaining a plurality of pieces of second traffic information generated during operation of the IoT device;
performing statistical analysis on the plurality of pieces of second traffic information to obtain fourth statistical analysis information; and
transmitting the fourth statistical analysis information to the edge security device, so that the edge security device transmits the fourth statistical analysis information to the central security device, and the central security device generates a traffic control strategy based on the fourth statistical analysis information.

11. An Internet of Things (IoT) device, comprising: a processor and a non-transitory machine-readable storage medium, the machine-readable storage medium storing machine-executable instructions executable by the processor;
wherein the processor is configured to execute the machine-executable instructions to implement the method according to claim 8.

12. An edge security device, comprising: a processor and a non-transitory machine-readable storage medium, the machine-readable storage medium storing machine-executable instructions executable by the processor;
wherein the processor is configured to execute the machine-executable instructions to perform operations comprising:
obtaining a plurality of pieces of first security event information generated during operation of the edge security device;
performing statistical analysis on the plurality of pieces of first security event information to obtain first statistical analysis information;
transmitting the first statistical analysis information to a central security device, so that the central security device generates a first target protection template based on the first statistical analysis information; wherein the first target protection template includes a security protection strategy generated based on the first statistical analysis information;
receiving the first target protection template transmitted by the central security device; and
protecting the edge security device based on the security protection strategy in the first target protection template,
wherein the processor is further configured to execute the machine-executable instructions to perform operations comprising:
obtaining a to-be-processed security analysis task, the security analysis task including a plurality of subtasks;
for each of the subtasks,
selecting a target task processing node from a plurality of task processing nodes based on an amount of hardware resources used to complete the subtask and a remaining amount of hardware resources of the plurality of task processing nodes;
allocating the subtask to the target task processing node, so that the target task processing node processes the subtask,
wherein the plurality of task processing nodes include: the edge security device, at least one IoT device managed by the edge security device; or, the edge security device, at least one IoT device managed by the edge security device, and at least one IoT device managed by one or more edge security devices other than the edge security device.

13. The edge security device according to claim 12, wherein before obtaining the plurality of pieces of first security event information generated during operation of the edge security device, the processor is further configured to execute the machine-executable instructions to perform operations comprising:
transmitting a first template request to the central security device, wherein the first template request includes a first category of the edge security device so that the central security device determines a first initial protection template corresponding to the first category;
receiving the first initial protection template transmitted by the central security device; and
protecting the edge security device based on the first initial protection template.

14. The edge security device according to claim 12, wherein the processor is further configured to execute the machine-executable instructions to perform operations comprising:
obtaining a plurality of pieces of first traffic information generated during operation of the edge security device;
performing statistical analysis on the plurality of pieces of first traffic information to obtain second statistical analysis information; and
transmitting the second statistical analysis information to the central security device, so that the central security device generates a traffic control strategy based on the second statistical analysis information.

15. The edge security device according to claim 12, wherein the processor is further configured to execute the machine-executable instructions to perform operations comprising:
obtaining third statistical analysis information of an Internet of Things (IoT) device, wherein the third statistical analysis information is obtained by the IoT device performing statistical analysis on a plurality of pieces of second security event information generated during operation of the IoT device;

transmitting the third statistical analysis information to the central security device, so that the central security device generates a second target protection template based on the third statistical analysis information; wherein the second target protection template includes a security protection strategy generated based on the third statistical analysis information;

receiving the second target protection template transmitted by the central security device; and transmitting the second target protection template to the IoT device, so that the IoT device protects the IoT device based on the security protection strategy in the second target protection template.

16. The edge security device according to claim 15, wherein before obtaining the third statistical analysis information of the IoT device, the processor is further configured to execute the machine-executable instructions to perform operations comprising:

receiving a second template request transmitted by the IoT device, the second template request including a second category of the IoT device, and determining whether the edge security device has a second initial protection template corresponding to the second category;

when the edge security device has a second initial protection template corresponding to the second category, transmitting the second initial protection template to the IoT device; and when the edge security device does not have a second initial protection template corresponding to the second category, transmitting the second template request to the central security device, so that the central security device determines a second initial protection template corresponding to the second category; receiving the second initial protection template transmitted by the central security device, storing a correspondence relationship between the second category and the second initial protection template in the edge security device, and transmitting the second initial protection template to the IoT device.

17. The edge security device according to claim 15, wherein the processor is further configured to execute the machine-executable instructions to perform operations comprising:

obtaining fourth statistical analysis information of the IoT device, wherein the fourth statistical analysis information is obtained by the IoT device performing statistical analysis on a plurality of pieces of second traffic information generated during operation of the IoT device; and transmitting the fourth statistical analysis information to the central security device, so that the central security device generates a traffic control strategy based on the fourth statistical analysis information.

* * * * *